United States Patent
Saito

(10) Patent No.: US 8,514,219 B2
(45) Date of Patent: Aug. 20, 2013

(54) 3D IMAGE SPECIAL EFFECTS APPARATUS AND A METHOD FOR CREATING 3D IMAGE SPECIAL EFFECTS

(75) Inventor: Hiroshi Saito, Osaka (JP)

(73) Assignee: Panasonic Corporation, Osaka (JP)

( * ) Notice: Subject to any disclaimer, the term of this patent is extended or adjusted under 35 U.S.C. 154(b) by 305 days.

(21) Appl. No.: 12/941,388

(22) Filed: Nov. 8, 2010

(65) Prior Publication Data
US 2011/0169820 A1 Jul. 14, 2011

(30) Foreign Application Priority Data

Nov. 9, 2009 (JP) ................................. 2009-255761

(51) Int. Cl.
*G06T 15/00* (2011.01)

(52) U.S. Cl.
USPC .......................................................... 345/419

(58) Field of Classification Search
None
See application file for complete search history.

(56) References Cited

U.S. PATENT DOCUMENTS

| 7,403,201 B2 * | 7/2008 | Takemoto et al. | 345/419 |
| 2007/0195082 A1 * | 8/2007 | Takanashi et al. | 345/419 |
| 2011/0096151 A1 * | 4/2011 | Hulyalkar et al. | 348/51 |

FOREIGN PATENT DOCUMENTS

JP 2002-271816 9/2002

* cited by examiner

*Primary Examiner* — Aaron M Richer
*Assistant Examiner* — Mohammad H Akhavannik
(74) *Attorney, Agent, or Firm* — Panasonic Patent Center

(57) ABSTRACT

A 3D image special effects apparatus for creating special effects on a 3D image including a first image and a second image having disparity. The 3D image special effects apparatus includes: a range specification receiving unit capable of receiving an input of a specified range of the first image on which the special effects are created; a first block division unit capable of dividing the specified range into a plurality of first image blocks; a first special effects unit capable of creating the special effects on each of the plurality of the first image blocks; a block matching unit capable of determining an image from the second image which corresponds to an image of the each of the plurality of the first image blocks, and deriving a parallax vector which represents a directionality and a magnitude of parallax between the first image blocks and the corresponding image; a second block division unit capable of determining a plurality of second image blocks on the second image in accordance with the parallax vector, the second image blocks corresponding to the plurality of first image blocks; and a second special effects unit capable of creating the special effects on the determined plurality of second image blocks.

6 Claims, 8 Drawing Sheets

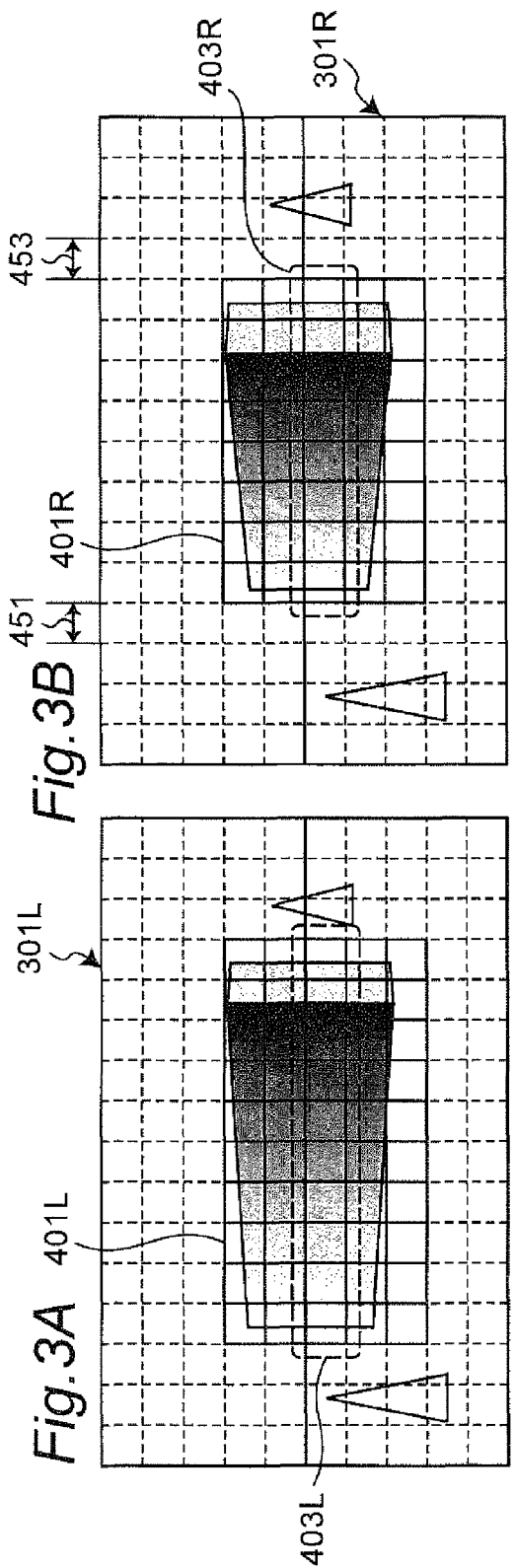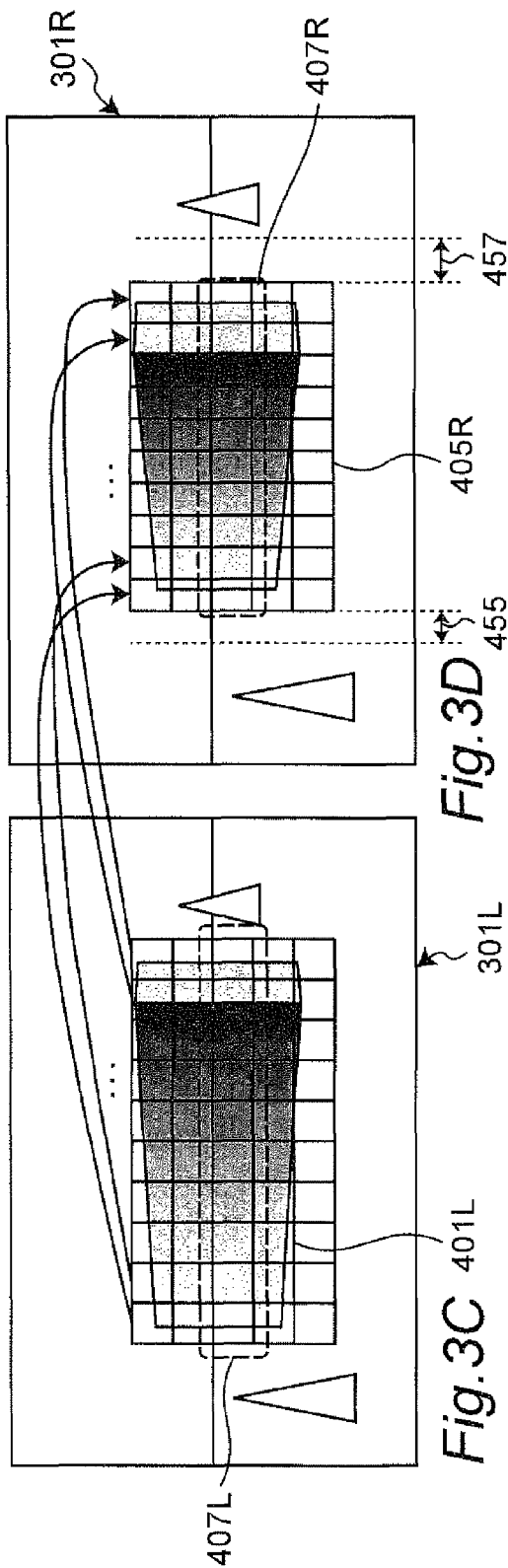

3D IMAGE SPECIAL EFFECTS APPARATUS AND A METHOD FOR CREATING 3D IMAGE SPECIAL EFFECTS

BACKGROUND

1. Technical Field

The technical field relates to a special effects apparatus that gives special effects to an image, and, more particularly to a 3D image special effects apparatus that gives special effects to a 3D image.

2. Related Art

In recent years, attention is paid to techniques relating to 3D images. 3D images are images that can be viewed stereoscopically, and for example, stereo images that are generated based on an image for the left eye and an image for the right eye captured synchronously (hereinafter, also referred to as "left-eye image" and "right-eye images"). Normally, the left-eye image and the right-eye image include disparity corresponding to the human's binocular disparity.

Actually, various apparatuses for displaying the 3D imagery and various methods for showing the 3D imagery to a viewer have already been proposed. They are based on the basic principle such that a viewer can be allowed to recognize a sense of depth of imagery using the disparity in the left-eye and right-eye images. Therefore, it is a very important factor for the quality of the 3D image that a sense of depth intended by image creators should be properly reflected in the disparity in the left-eye and right-eye images. Such a quality determining factor is not present in the conventional 2D image.

In order to encourage full-scale utilization of contents using the 3D image, not only development of image pick-up apparatuses, reproducing apparatuses and display devices but also development of editing apparatuses suitable for editing a 3D image is important. It is desired that the editing apparatuses not only simply connect cut scenes but create various special effects (visual effects) and the like efficiently in accordance with the intentions of 3D image creators. In addition, due to the above-described reason, it is desired that the 3D image editing apparatuses should maintain a stereoscopic effect (a sense of depth) of an original 3D image accurately in an edited 3Dimage. In order for the stereoscopic effect to be retained, it is important to maintain the disparity in the left-eye and right-eye images of the original 3D images after editing.

JP 2002-271816A discloses a 3D image special effects apparatus that performs mosaic processing (pixelization) as special effects to a 3D image. When the 3D image special effects apparatus of JP 2002-271816A receives an input about a region (specified region) to be subjected to the mosaic processing in a left-eye image or a right-eye image of an original 3D image, the apparatus detects a region (detected region) of the right-eye image or the left-eye image of the original 3D image to be subjected to the mosaic processing based on an image on a central part of the specified region, and executes the mosaic processing on the specified region and the detected region.

SUMMARY

In general, a 3D image includes a plurality of subjects (animations and characters may be included), and depth effects vary among the subjects. It goes without saying that the depth effect occasionally varies in one subject. For this reason, small regions each of which has a parallax of different direction and size with each other are irregularly present in the left-eye and right-eye images.

However, in the conventional 3D image special effects apparatuses, in a case where the region to be subjected to special effects is composed of a plurality of small regions each of which has a parallax of different direction and size with each other, the difference among the parallaxes of the small regions is not sufficiently taken into consideration. For this reason, in the conventional 3d image special effects apparatuses, a depth effect of a certain small regions within an image may change before and after the special effects, and a correspondence relationship of color information such as hue and luminance between the small region in the left-eye image and a corresponding small region of the right-eye image may occasionally be disturbed.

In view of the above problem, a 3D image special effects apparatus that can further suppress a deterioration of the image quality of a 3D image due to special effects in comparison with the conventional apparatuses is provided.

One aspect provides a 3D image special effects apparatus for creating special effects on a 3D image including a first image and a second image having disparity. The 3D image special effects apparatus includes: a range specification receiving unit capable of receiving an input of a specified range of the first image on which the special effects are created; a first block division unit capable of dividing the specified range into a plurality of first image blocks; a first special effects unit capable of creating the special effects on each of the plurality of the first image blocks; a block matching unit capable of determining an image from the second image which corresponds to an image of the each of the plurality of the first image blocks, and deriving a parallax vector which represents directionality and a magnitude of parallax between the first image blocks and the corresponding image; a second block division unit capable of determining a plurality of second image blocks on the second image in accordance with the parallax vector, the second image blocks corresponding to the plurality of first image blocks; and a second special effects unit capable of creating the special effects on the determined plurality of second image blocks.

In the one aspect, it may be possible that: the block matching unit performs block matching onto a partial region of the second image only in a horizontal direction.

In the one aspect, it may be possible that: the parallax vector derived by the block matching unit has an accuracy in a one-pixel unit.

In the one aspect, it may be possible that: the second special effects unit includes: a depth determining unit capable of determining a depth of each of the plurality of the second image blocks in the 3D image based on the directionality and the magnitude of the parallax vector; an order determining unit capable of determining an order of the special effects among the plurality of the second image blocks based on the depth; and a second special effects processing unit capable of creating the special effects on the each of the plurality of the second image blocks in accordance with the order.

In the one aspect, it may be possible that: the special effects are mosaic processing.

In the one aspect, it is possible that: the special effects are a contrast adjusting process.

Another aspect provides a method for creating 3D image special effects in which special effects are created on a 3D image including a first image and a second image having disparity. The method for creating 3D image special effects includes: receiving an input of a specified range of the first image on which the special effects are created; dividing the specified range into a plurality of first image blocks; creating the special effects on each of the plurality of first image blocks; determining an image from the second image which corresponds to an image of the each of the plurality of the first image blocks, and deriving a parallax vector which represents a directionality and a magnitude of parallax between the first image blocks and the corresponding image; determining a plurality of second image blocks on the second image in accordance with the parallax vector, the second image blocks corresponding to the plurality of the first image blocks; and creating the special effects on the determined plurality of second image blocks.

The 3D image special effects apparatus according to the one aspect can further suppress the deterioration in image quality of a 3D image due to special effects in comparison with the conventional apparatuses.

BRIEF DESCRIPTION OF DRAWINGS

FIG. 3A is an example of a specified range of the left-eye image blocked by means of grids fixed to a frame (fixed grids);

FIG. 3B is an example of a corresponding range of the right-eye image blocked by means of the fixed grids same as those of the left-eye image;

FIG. 3C is an example of a blocked specified range of the left-eye image;

FIG. 3D is an example of a corresponding range of the right-eye image blocked by means of grids adjusted with respect to the parallax of the left-eye image blocks (parallax adjusted grids);

DETAILED DESCRIPTION OF PREFERRED EMBODIMENTS

Embodiments are described in detail below with reference to the accompanying drawings.
Outline
The embodiments are 3D image special effects apparatuses suitable for 3D images. In the following description, the 3D image special effects apparatus is abbreviated as "special effects apparatus". The special effects include special effects (SFX, SpFX) provided at a time of shooting and visual effects (VFX) provided at a time of post-shooting.

The special effects apparatus can easily create special effects having an appropriate depth effect in a 3D image. The appropriate depth effect means that a depth effect of an original 3D image is correctly reflected in the created special effects. When the depth effect of the original 3D image is arbitrarily changed by special effects according to operator's intention, the appropriate depth effect includes the depth effect intended by the operator.

When an operator specifies a range (specified range) of one of a left-eye image and a right-eye image (first image) composing a 3D image on which he/she would create the special effects, the special effects apparatus automatically determines a range (corresponding range) in the other image (second image) where the special effects should be created, and creates the special effects on both of the left-eye and right-eye images so as to output a 3D image on which the special effects are created. At the time of determining the corresponding range, the special effects apparatus detects disparity (parallax) of contents of the 3D image based on the image content in the specified range of the first image, and detects a range of the second image corresponding to the specified range based on a magnitude and a direction of the detected parallax, so as to determine the corresponding range. As a result, the parallax between the specified range and the corresponding range satisfactorily reflects the disparity of the original 3D image. The special effects are created on the specified range and the corresponding range, so that the special effects having an appropriate depth effect are realized.

The special effects apparatus avoids creating a planar image region due to unintentional disappearance of depth effect of the original 3D image that may occurs through the special effects creation onto the region. Further, the special effects apparatus suppresses an unnatural image which a viewer experiences spatial perception difficulty due to an unintentional change of the depth effect that may occurs through the special effects creation onto the region. Accordingly, the special effects can be created on a 3D image without deteriorating image quality of the original 3D image, thereby the special effects device apparatus achieves remarkable advantageous effects in view of the image quality and protection of the viewer's health.

First Embodiment

1. Principle of 3D Image

Figure 1:
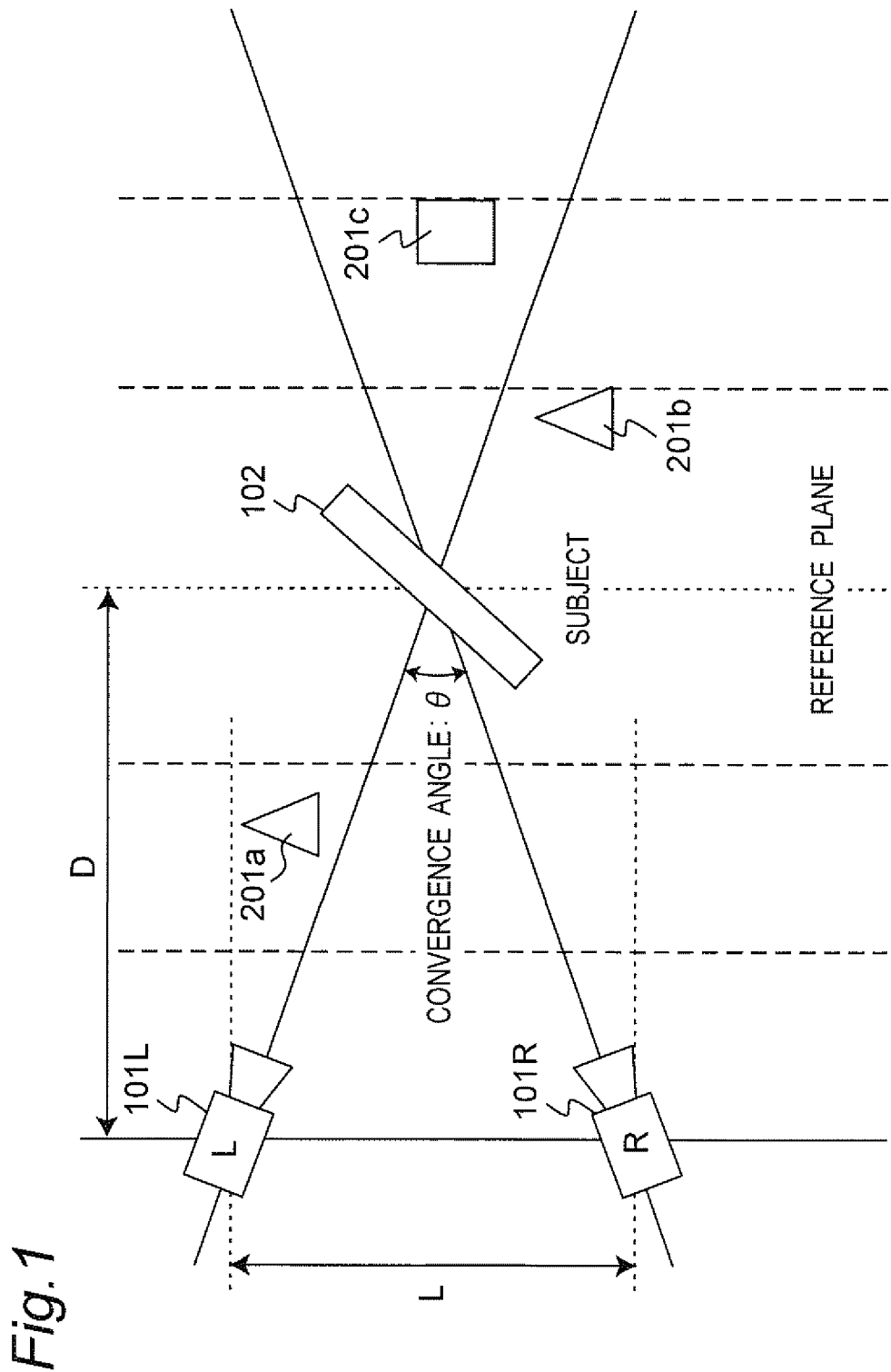
FIG. 1 is a diagram illustrating a principle of a 3D image.

FIG. 1 is a schematic diagram illustrating camera setting used for shooting 3D images. Parallax between human's left and right eyes is simulated by an installation interval L between a left-eye camera 101L and a right-eye camera 101R, and a convergence angle θ of the left-eye and right-eye cameras 101L and the 101R. The convergence angle θ is an angle between optical axes of the left-eye and right-eye cameras 101L and 101R.

The average interval between human's (adult) right and left eyes is 65 mm. Therefore, the installation interval L is generally 65 mm. Distance D from the left-eye and right-eye video cameras 101L and 101R to a reference plane is determined in accordance with the installation interval L and the convergence angle θ.

As to a subject 102 on the reference plane, a parallax between a left-eye image and a right-eye image of a 3D image becomes zero. As the subject separates farther from the reference plane, the magnitude of its parallax in the 3D image monotonously increases. In the drawing, the magnitude of a parallax of a subject 201c in the 3D image is larger than the magnitudes of parallaxes of subjects 201a and 201b. Further, directionality of the parallax of a subject in the 3D image is reversed at the reference plane. In the drawing, the direction of the parallax of the subject 201a in the 3D image is reversed to the directions of the parallaxes of the subjects 201b and 201c, and the directions of the parallaxes of the subjects 201b and 201c are the same as each other. In the 3D image, the direction and the magnitude of the parallax of a plurality of subjects vary, so that the depth effects of the respective subjects are differently perceived by a viewer.

Figure 2A:
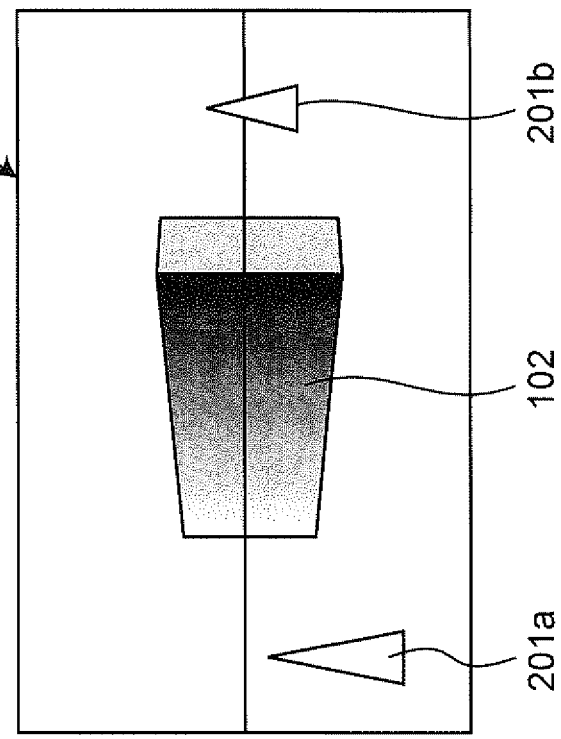
FIG. 2A is an example of a left-eye image composing the 3D image.
Figure 2B:
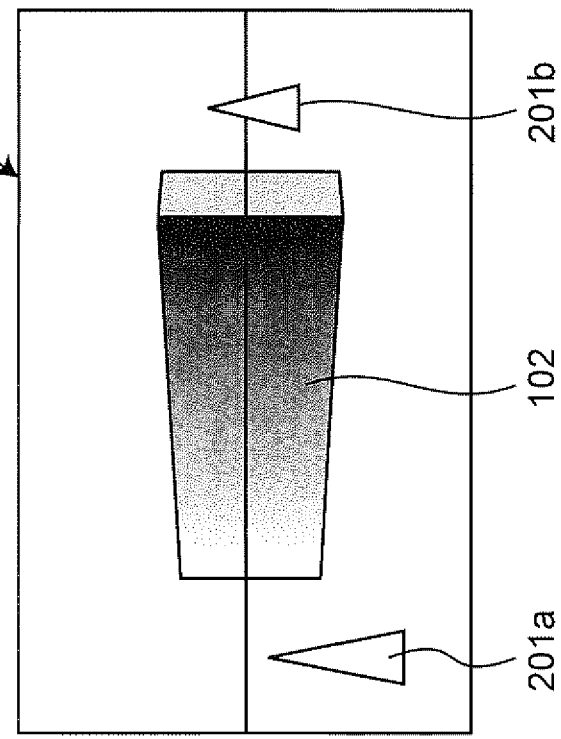
FIG. 2B is an example of a right-eye image composing the 3D image.

FIG. 2 is an example of a 3D image shot with the configuration shown in FIG. 1. When the left-eye camera 101L and the right-eye camera 101R synchronously capture images, the left-eye camera 101L captures a left-eye image 301L, and the right-eye camera 101R captures a right-eye image 301R. The subjects 102, 201a and 201b are shown on both of the images 301L and 301R, but both of the images have disparity corresponding to the human's binocular disparity. The left-eye image 301L is presented to a viewer's left eye and the right-eye image 301R is presented to a right eye so that a stereoscopic image (3D image) is displayed.

2. Special Effects

FIG. 3 is an example of special effects process to a 3D image. Mosaic processing (pixelization) is described as an example of the special effects.

The mosaic processing is processing for painting a certain region in a specific color based on color information included in the region of an image. As the specific color, an average value, or a representative value of the color included in the region may be used. Due to the mosaic processing, resolution of an image is reduced. A size of the region (block) can be arbitrarily selected. When the size of the block is set to be small, a level of the reduction in the resolution of the image subject to the mosaic processing is low, and when the size of the block is set to be large, the resolution of the image subject to the mosaic processing greatly reduces.

Conventional mosaic processing is described first with reference to FIGS. 3A and 3B. FIG. 3A is a diagram illustrating the left-eye image 301L of an original 3D image. An operator specifies a range 401L of the left-eye image 301L on which special effects are to be created. As a result, the specified range is divided into a plurality of blocks according to predetermined grids (broken line), and the mosaic processing is executed on each block. FIG. 3B is a diagram illustrating the right-eye image 301R corresponding to the left-eye image 301L of FIG. 3A. On the right-eye image 301R, a corresponding range 401R is divided into a plurality of blocks according to the same grids (fixed grids) as those of the left-eye image, and the mosaic processing is executed on each block. The corresponding range 401R may be manually determined by the operator, or may be automatically determined by the special effects apparatus. When the operator manually determines the range, the special effects apparatus for a 2D image can be used.

For the above reason, on the 3D image which has undergone the special effects processing, the corresponding range 401R (obtained with the use of the fixed grids) has parallax 451 on its left end, and parallax 453 on its right end. The parallax 451 is perceived with a depth effect being farther from the reference plane by the viewer, and the parallax 453 is perceived with a depth effect being closer from the reference plane by the viewer. In this processing example, because the specified range and the corresponding range of the left-eye and right-eye image 301L and 301R are divided into blocks by using the same grids, the parallax of the subject in the original 3D image is not sufficiently reflected. For this reason, in the 3D image which has undergone the special effects processing, a stereoscopic effect is lost in the range on which the special effects are created, and consistency between the range on which the special effects are created and the range on which the special effects are not created is deteriorated. As a result, the depth effect on the range on which the special effects are created varies regardless of operator's intention.

When attention is paid to the ranges 403L and 403R in FIGS. 3A and 3B, it is found that the number of blocks is different. For this reason, the correspondence relationship of the blocks between the left-eye and right-eye images falls apart, and it might be difficult for the viewer to stereoscopically view the image. If the number of blocks is kept equal between both of the left and right images, boundaries and sizes of the blocks become equal since the same grids are used for the block division. As a result, the correspondence relationship of the subjects included in the ranges on which the special effects are created falls apart. For this reason, the color information included in the blocks establishing the correspondence relationship between the right and left-eye images is different from each other, and the colors used in the mosaic processing are different from each other between the corresponding blocks of the left and right images. Also in this case, it might be difficult for the viewer to stereoscopically view the image.

Accordingly, in the first embodiment, as shown in FIGS. 3C and 3D, after the range 401L specified in the left-eye image 301L by the operator is divided into a plurality of blocks having a predetermined shape and size, the apparatus detects blocks from the right-eye image 301R that correspond to the blocks in the range 401L through block matching. The apparatus then determines a range in the right-eye image 301R on which the special effects are created block-by-block. As a result, the range of the right-eye image 301R that correspond to the specified range 401L of the left-eye image 301L is determined as a corresponding range 405R (divided into blocks by means of parallax adjusted grids).

The specified range 401L and the corresponding range 405R are determined in such a manner. As a result, on the 3D image to which the special effects are provided, the range on which the special effects are created has parallax 455 on its left end and parallax 457 on its right end, and on the entire corresponding range 405R, the parallax with respect to the specified range 401L is correctly reflected. For this reason, even on the 3D image to which the special effects are provided, the depth effect of the original 3D image is maintained on the range on which the special effects are created. Further, since the blocks on the right-eye image 301R corresponding to the blocks of the left-eye image 301L are determined by block matching, the color information such as hue and luminance of the blocks on both the right-eye and left-eye images satisfactorily matches with each other. In the examples of FIGS. 3C and 3D, therefore, the colors used for coloring in the mosaic processing match with each other on the corresponding blocks on both the left and right-eye images. For this reason, on the 3D image on which the special effects are created, the depth effect in the range to which the special effects are provided and the correspondence relationship between both the left and right-eye images are satisfactorily maintained.

3. Configuration of the Special Effects Apparatus

Figure 4:
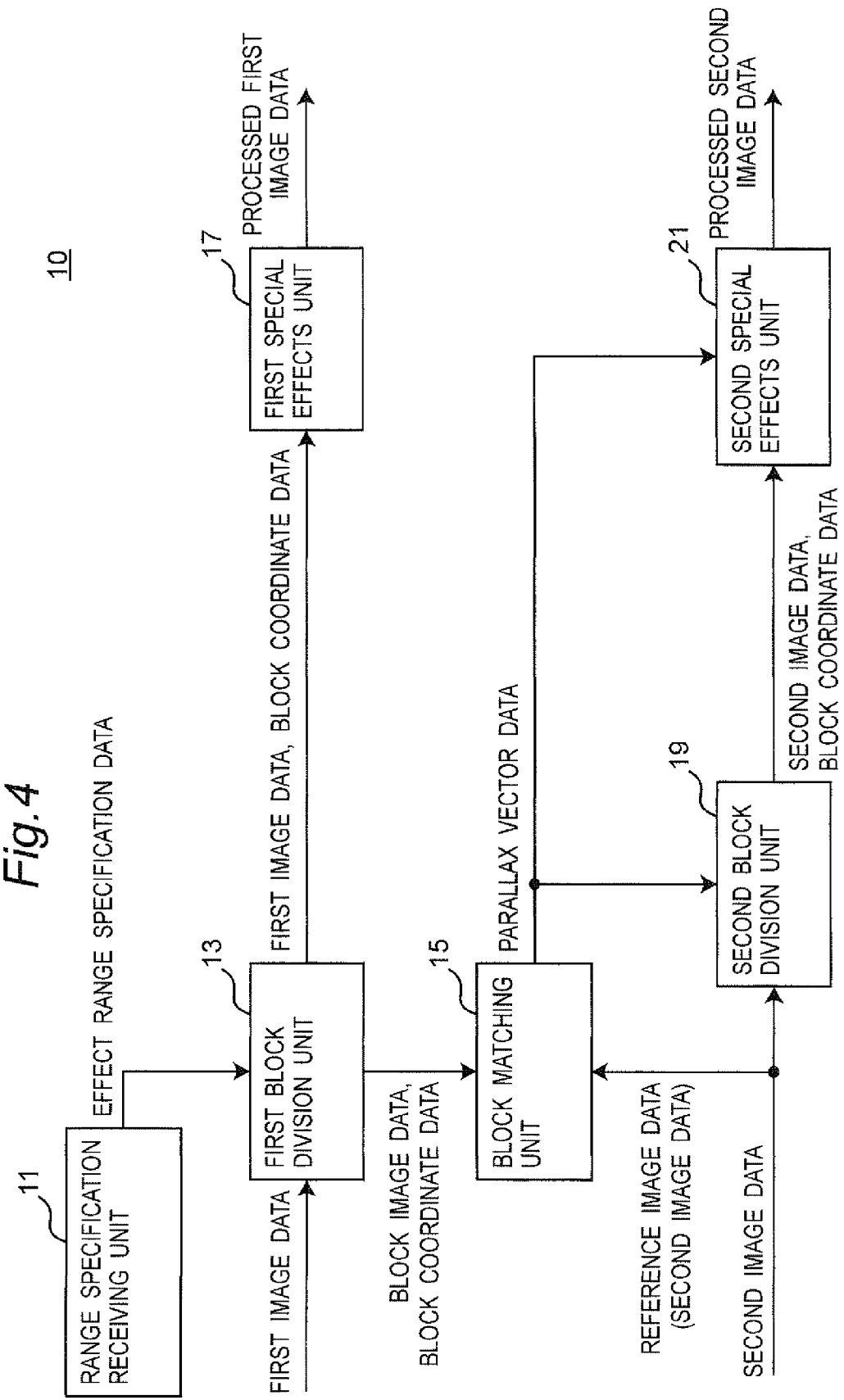
FIG. 4 is a block diagram of a 3D image special effects apparatus according to an embodiment.

FIG. 4 is a block diagram of a configuration of the special effects apparatus according to the first embodiment. In the following, a left-eye image and a right-eye image of a 3D image are a first image and a second image, respectively, but they may be reversed.

The special effects apparatus 10 has a range specification receiving unit 11, a first block division unit 13, a first special effects unit 17, a block matching unit 15, a second block division unit 19, and a second special effects unit 21. The range specification receiving unit 11 receives an input of specification of a range of the first image on which special effects should be created. The first block division unit 13 divides the specified range of a first image into a plurality of blocks. The first special effects unit 17 creates special effects onto the specified range of the first image. The block matching unit 15 detects an image region on the second image that corresponds to the blocks of the first image by performing block matching to a second image with the blocks of the first image so as to derive a parallax vector described later. The second block division unit divides the second image into blocks (corresponding blocks) which corresponds to the blocks of the first image based on the parallax vector. The second special effects unit 21 creates special effects onto the corresponding range which is composed of the corresponding blocks.

When the range specification receiving unit 11 receives the input of the specification of a range, the receiving unit 11 outputs information about the specified range such as its coordinate in the first image as effect range specification data to the first block division unit 13.

The first block division unit 13 inputs the effect range specification data and first image data so as to divide the specified range of the first image into blocks having a predetermined shape, such as rectangular shape. Besides the predetermined shape, a shape of a subject included in a specified range is obtained by edge detection or the like, and the block division may be performed so that the block may have the shape along the subject. In addition, the blocks having the shape of the subject may further be divided into a predetermined shape. The first block division unit 13 outputs the result of the block division to the first special effects unit 17 and the block matching unit 15. The result of the block division may be block coordinate data such as coordinates of block boundaries, but they are not limited to this type of data. The first image data is transmitted to the first special effects unit 17. Images of the respective blocks of the first image are transmitted as block image data to the block matching unit 15.

The block matching unit 15 performs block matching to an image of each block of the first image with the second image (reference image), and detects an image region (corresponding block) in the second image which corresponds to the block of the first image. The block matching unit 15 outputs a distance between the blocks of the first image and the corresponding blocks as parallax vector data to the second block division unit 19 and the second special effects unit 21. The parallax vector data may include a positional vector of the blocks in the first image and a positional vector of the corresponding blocks in the second image. In another way, the parallax vector data may include a vector that is equal to a difference between the positional vector of the blocks on the first image and the positional vector of the corresponding blocks on the second image.

The second block division unit 19 divides the second image into blocks (corresponding blocks) which correspond to the blocks of the first image based on the parallax vector data. The second block division unit 19 outputs a result of the block division to the second special effects unit 21. The result of the block division may be block coordinate data such as coordinates of block boundaries, but they are not limited to this type of data. The second special effects unit 21 also receives data of the second image. The second block division unit 19 may further receive the block coordinate data of the first image from the first block division unit 13, and may divide the second image into the corresponding blocks based on the parallax vector and the block coordinate data of the first image.

The second special effects unit 21 inputs the second image data, the block coordinate data about the corresponding blocks of the second image and the parallax vector data, executes the special effects process on the range composed of the corresponding blocks (corresponding range), so as to output processed second image data. Configuration of the second special effects unit 21 is described in detail further with reference to FIG. 5.

Figure 5:
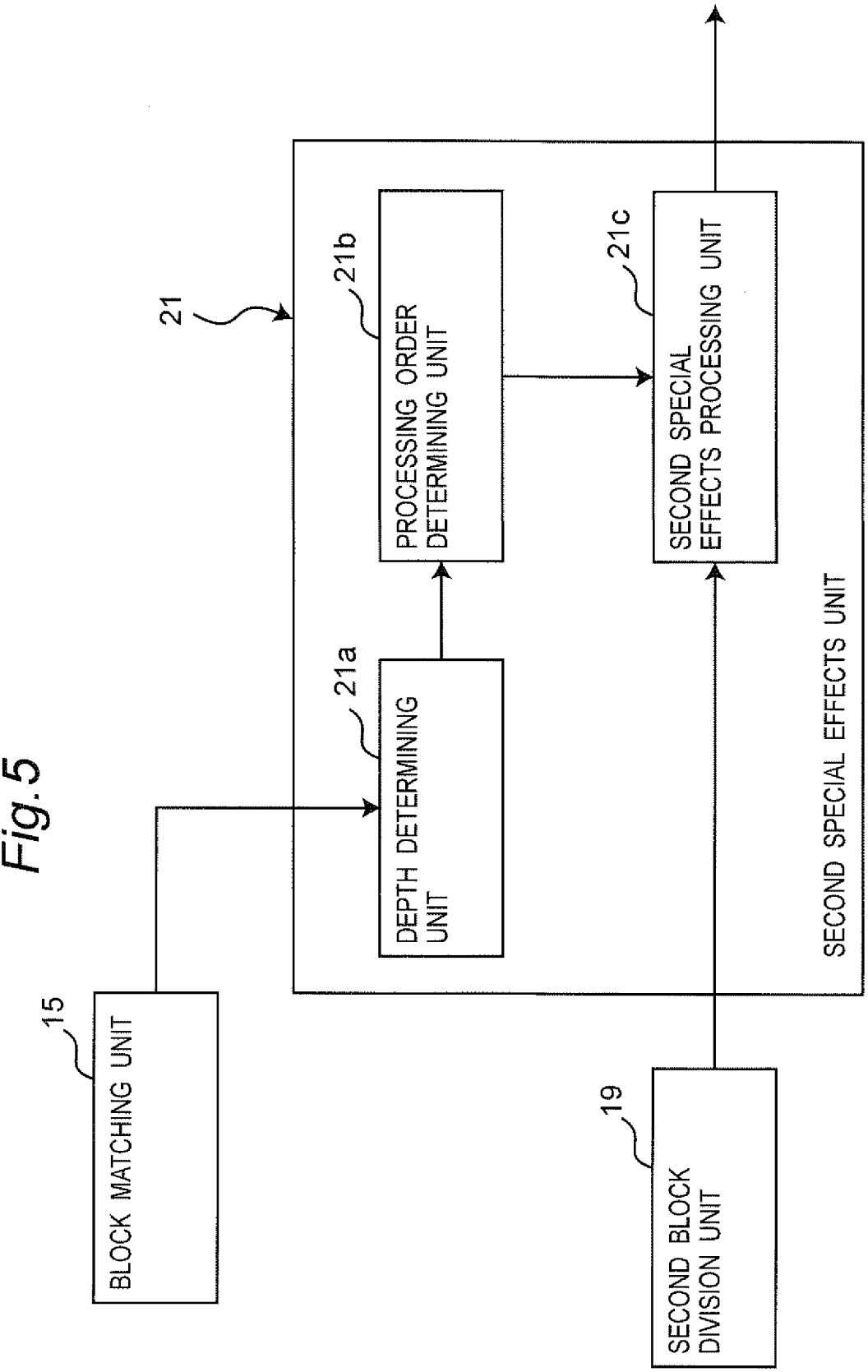
FIG. 5 is a detailed block diagram of a second special effects unit of the 3D image special effects apparatus.

FIG. 5 is a block diagram of the details of the second special effects unit 21.

A depth determining unit 21a determines an amount of depth (assigned position along a depth-wise direction within the 3D image) of the corresponding block of the second image based on the parallax vector data. More concretely, the depth determining unit 21a derives a depth of the corresponding block of the second image based on directionality and a magnitude of the parallax vector.

A processing order determining unit 21b determines a processing order of the special effects process among the plurality of corresponding blocks of the second image based on the depth amount of each of the corresponding blocks of the second image. More concretely, the processing order determining unit 21b determines the processing order of each of the corresponding blocks based on the depth amount of the corresponding blocks of the second image so that the corresponding blocks are processed from a corresponding block perceived as being farther from a viewer on the 3D image to a corresponding block perceived as being closer to the viewer. As a result, when corresponding blocks of second image partially overlapping with each other exist, the special effects created to the corresponding block being farther from the viewer is overwritten and hidden by the special effects created to the corresponding block being closer to the viewer.

A second special effects processing unit 21c executes the special effects process to the corresponding blocks of the second image according to the processing order, so as to execute the special effects processing on the corresponding range composed of the corresponding blocks and output the processed second image data.

The first special effects unit 17 may have a functionality equivalent to that of special effects processing unit of a conventional special effects apparatus. The first special effects processing unit of the first special effects unit 17 executes the special effects processing to the specified range, and outputs processed first image data.

4. Special Effects Processing Flow

Figure 6:
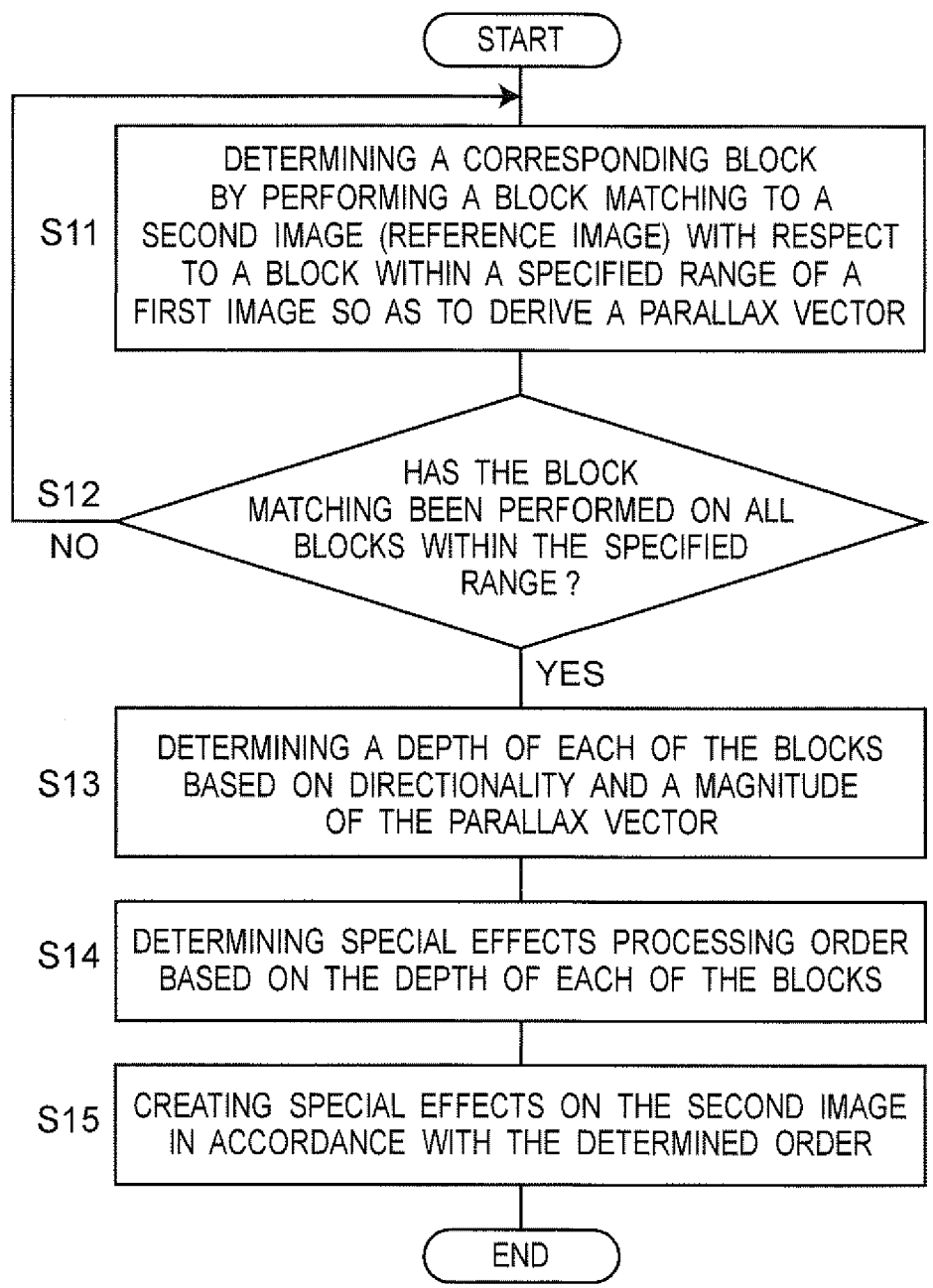
FIG. 6 is a flowchart of processes performed by the 3D image special effects apparatus.
Figure 7B:
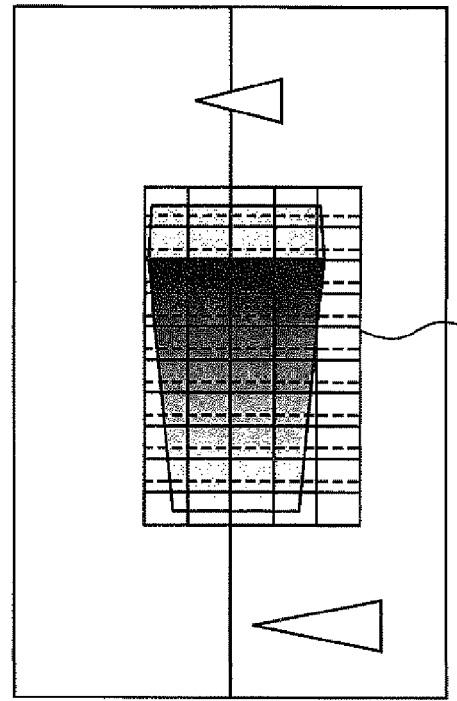
FIG. 7B is an example of a process for block matching on blocks of the left-eye image (first image) to the right-eye image (second image)
Figure 7C:
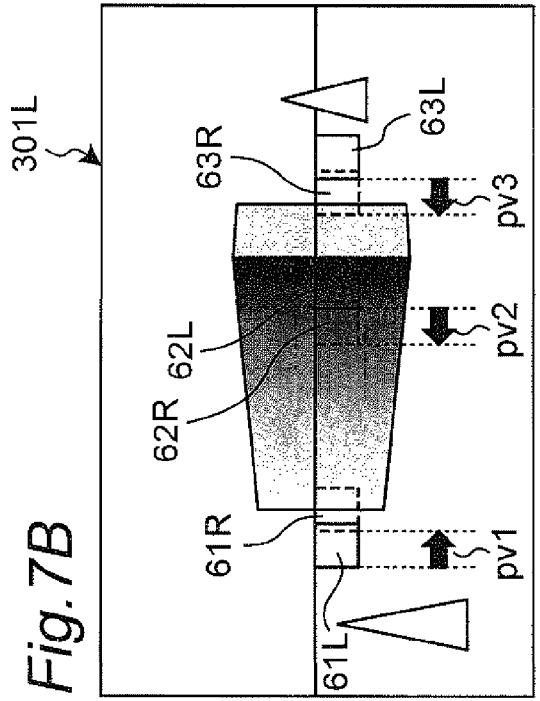
FIG. 7C is an example of the corresponding range of the right-eye image (second image) blocked by means of the parallax adjusted grids.
Figure 7A:
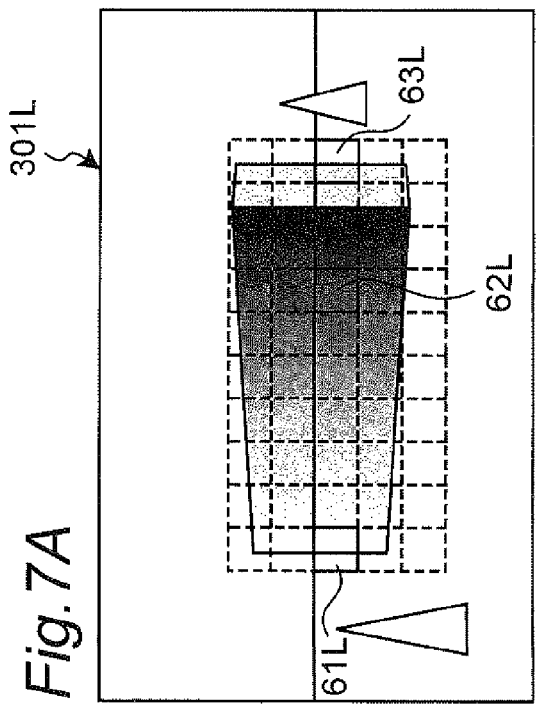
FIG. 7A is an example of a process for blocking a specified range of the left-eye image (first image)

A flow of the processing performed by the special effects apparatus 10 according to the first embodiment is described below with reference to FIGS. 6 to 8. FIG. 6 is a flowchart illustrating processing performed by the block matching unit 15, the second block division unit 19 and the second special effects unit 21. FIGS. 7A and 7B are an example of the block division to the specified range of the left-eye image 301L (FIG. 7A) and an example of the parallax vector and the corresponding blocks of the second image determined by the block matching between the blocks of the specified range and the blocks of the second image.

When receiving an input of the specification of the range of the first image on which the special effects are created, the special effects apparatus 10 divides the specified range into blocks. In FIG. 7A, a rectangular region shown by a broken line is the specified range. The specified range is divided into small rectangular blocks.

The block matching unit 15 performs block matching to each of the blocks within the specified range of the first image with the second image. The block matching unit 15 performs searching for a position within the right-eye image that best matches with each block within the specified range of the first image. Several approaches may be used for the block matching. For example, a sum of absolute values of a difference (SAD) among all pixels in the block is calculated, and the block matching can be performed by using the obtained value. A position where the SAD becomes the smallest is the matching position. The block matching unit 15 determines a parallax vector of a corresponding block of the second image which corresponds to a block within the first image using the position of the block of the first image and the matching position as reference points. The parallax vector may be determined based on a difference between the positional vectors of the positions of the block on the first image and the matching position (the position of the corresponding block) (step S11).

The block matching unit 15 may perform block matching with accuracy of one pixel, and may output a parallax vector having the accuracy of one pixel.

The directionality of the parallax vector has a one-to-one correspondence to whether or not the assigned depth-wise position of the image of the corresponding block 61R in a 3D image is located on a viewer side with respect to the reference plane. The magnitude of the parallax vector has a one-to-one correspondence to a magnitude of an interval along the depth-wise direction between the reference plane and the position where the image of the corresponding block 61R is located in the 3D image. The corresponding block of the second image determined in such a manner is a block that well suitably matches with the block of the first image, and the parallaxes of the blocks are sufficiently reflected in the position of the corresponding block on the second image.

For example, when a corresponding block on the second image, which corresponds to the block 61L on the first image (FIG. 7A), is determined as a corresponding block 61R by the block matching as shown in FIG. 3B, the parallax vector of the corresponding block 61R from the block 61L has its direction and magnitude as a vector pv1. Similarly, when blocks on the second image which correspond to the block 62L and the block 63L on the first image are determined as corresponding blocks 62R and 63R by the block matching, parallax vectors of the corresponding blocks 62R and 63R from the blocks 62L and 63L are determined as vectors pv2 and pv3. When all the corresponding blocks on the second image and the parallax vectors of all the corresponding blocks on the second image is determined, a special effects range (correspondence range) on the second image is determined. FIG. 7C is a diagram illustrating a correspondence range 405R on the second image. On the correspondence range 405R, when the parallax varies among the corresponding blocks, the corresponding blocks overlap at least partially with each other. The second block division unit 19 derives coordinate data of the corresponding blocks on the second image from the result of the block matching, and outputs the 3Dimage data and the coordinate data about the corresponding blocks on the second image to the second special effects unit 21.

The block matching of a block of the first image with the second image may be performed only with a part of the second image of the same vertical level as that of the block of the first image. The block matching does not have to be performed on the entire second image. Therefore, only the block matching in the horizontal direction is necessary and sufficient. Therefore, in the block matching, a position where SAD becomes the smallest may be searched for while shifting the block of the first image horizontally. In this case, the parallax vector can be treated as a one-dimensional vector amount (a positive or negative scalar quantity). In this case, therefore, computational resources can be greatly saved.

When the block matching is performed on all the blocks of the first image ("YES" at step S12), the process goes to step S13.

The depth determining unit 21a of the second special effects unit 21 derives a depth of each of the corresponding blocks based on the directionality and the magnitude of each of the parallax vectors of the corresponding blocks of the second image (step S13).

The processing order determining unit 21b of the second special effects unit 21 determines special effects processing order among the corresponding blocks based on the depth of the corresponding blocks so that the corresponding block located on a position farther in the 3D image from the viewer firstly undergoes the special effects processing (step S14).

The second special effects processing unit 21c of the second special effects unit 21 creates special effects for images of the corresponding blocks of the second image in accordance with the special effects processing order, and overwrites the created image over the second image at the position of the corresponding blocks on the second image (step S15).

In the second special effects unit 21, the corresponding block whose depth is deeper (viewed farther) first undergoes the special effects process, and the created special effects images are sequentially written over the second image. Accordingly, even when the corresponding blocks overlap with each other, the special effects image for the corresponding block whose depth is comparatively deeper is masked in its overlapped portion by the special effects image of the corresponding block whose depth is shallower (viewed nearer).

The first special effects unit 17 creates the special effects for the specified range of the first image using a general special effects processing, and outputs the first image on which the special effects are created.

Figure 8A:
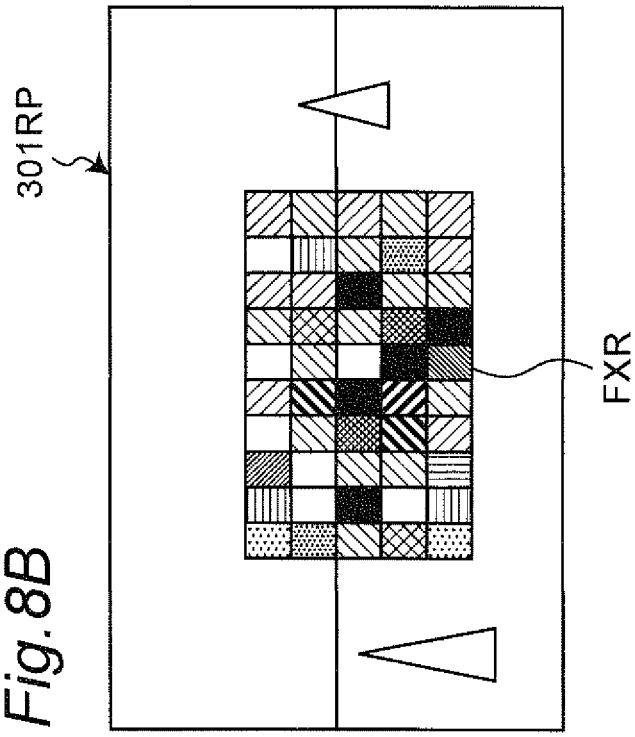
FIG. 8A illustrates a left-eye image (first image) of a processed 3Dimage.
Figure 8B:
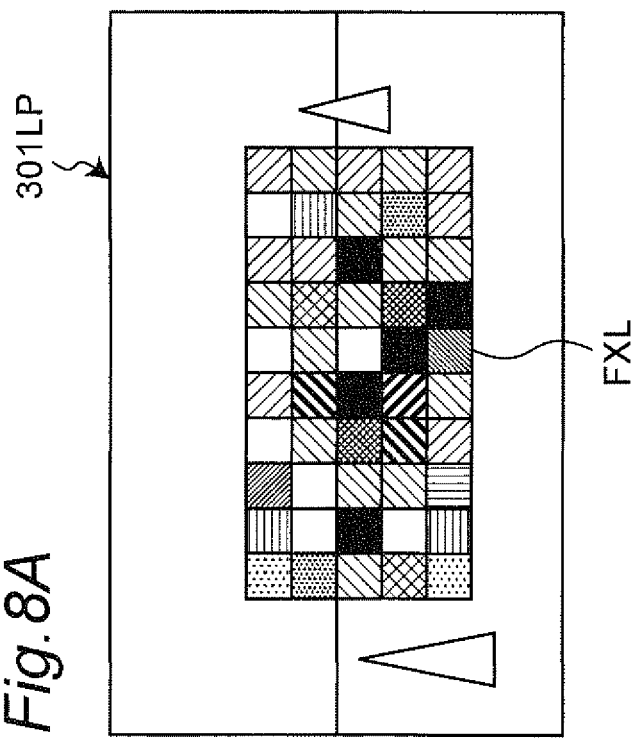
FIG. 8B illustrates a right-eye image (second image) of the processed 3Dimage.

FIG. 8 is a diagram illustrating an example of the obtained 3Dimage on which the special effects are created. FIG. 8A is a diagram of an example of a left-eye image 301LP obtained by providing special effects to the specified range of the first image, and FIG. 8B is a diagram of an example of a right-eye image 301RP obtained by providing special effects to the corresponding range of the second image. Special effects FXL is created in the specified range of the first image (left-eye image), and special effects FXR is created in the corresponding range of the second image (right-eye image).

In the special effects apparatus according to the first embodiment, the ranges on the left-eye image and the right-eye image of the 3D image, on which the special effects (mosaic processing) are to be created, have the correspondence according to the disparity in the range of the original 3D image. For this reason, the depth effect in the range on which the special effects are created is the same as that of the original 3D image, and thus comfortable and natural 3Dmosaic processing can be executed. Further, even when a subject surface has very small unevenness, the shape of such very small unevenness can be reflected in the special effects block division.

In a 3D image, even when the ranges on which the special effects are created include blocks whose depth effects are different with each other, the special effects apparatus changes parallax in a unit of a block and executes the special effects processing. For this reason, stereoscopic special effects can be realized. Even when blocks overlap with each other, since the special effects processing is performed from the block located farther in the 3D image sequentially, the natural stereoscopic effect can be realized. Further, in the special effects such as the mosaic processing, the processing on the respective blocks is performed based on the color information of the respective blocks. In the special effects apparatus, the processing range is determined by the block matching in a unit of a block. For this reason, the color information such as hue and luminance of the corresponding blocks on both of the right and left-eye images matches satisfactorily. Therefore, the special effects processing that does not provide a viewer with a feeling of strangeness can be realized.

In the first embodiment, the first image is the left-eye image and the second image is the right-eye image, but even if the left and right-eye images are reversed, the flow of the processing does not have to be changed. The mosaic processing is described as an example of the special effects, but the special effects are not limited to the mosaic processing. For example, they may be various types of filter processing or chroma key synthesis. In the chroma key synthesis, for example, a threshold of the chroma key synthesis can be changed for each block so that the processing can be executed, thereby realizing a high-quality 3D chroma key synthesizing process.

Second Embodiment

As a second embodiment, the special effects apparatus that partially adjusts the contrast of a 3D image as special effects is described. Since a configuration of the special effects apparatus according to the second embodiment may substantially be the same as that of the first embodiment except for the content of the special effects processing performed by the first and second special effects processing units (17a and 21c), the description thereof is arbitrarily omitted.

Also on a 3D image, there may be a case where the contrast of a specific range should be adjusted. For this reason, the specified range is further divided into a plurality of blocks, for example, and the contrast adjusting process is executed to pixels in the respective blocks. As a result, adjustment such that only a face part is made to be bright is enabled, for example, on an image of a human whose face part is darkened due to backlighting.

Conventionally, in order that the contrast adjusting process on a specific range of a 3D image be executed, the contrast adjusting process is executed separately on a left-eye image and a right-eye image by a 2D image editing apparatus. In the conventional 2D editing apparatus, however, it is impossible to correlate the ranges to which the contrast adjusting process should be executed or the blocks further divided from the ranges of the left-eye and right-eye images. Therefore, the depth effect of the portions which have undergone the contrast adjusting process vary. As a result, the stereoscopic effect of an original 3D image is occasionally deteriorated.

In the special effects apparatus according to the second embodiment, the parallaxes of the right and left-eye images are reflected in the block position of the contrast adjusting process by the method similar to that in the special effects apparatus according to the first embodiment. As a result, a 3D image whose contrast is partially adjusted is generated without deteriorating a stereoscopic effect of an original 3D image.

The operator specifies a range of the first image that should undergo the contrast adjusting process. The range which should undergo the contrast adjusting process may be specified by, for example, an operator who specifies a range on the screen of the display device with reference to the first image displayed on the display device.

The first block division unit 13 divides the specific range on the first image into a plurality of blocks according to a predetermined block size. The first image may be divided into blocks with fixed grids provided from one end of the left-eye image at constant intervals. The first special effects unit 17 may adjust the contrast of the first image.

The block matching unit 15 searches for a position within the second image (right-eye image) that matches with the blocks of the first image most satisfactorily.

The second block division unit 19 divides the second image based on the parallax vector and the like.

The second special effects unit 21 performs the contrast adjusting process to the blocks of the second image as described in the first embodiment.

The parallax between the left-eye and the right-eye images of the 3D image is reflected in the block division position of the contrast adjusting process, so that a three-dimensional position (depth effect) of a part of the image on the left-eye image and the right-eye image that have undergone the contrast adjusting process becomes the same as the depth effect of the original 3D image. As a result, the comfortable and natural 3D contrast adjusting process can be executed.

In the description of the second embodiment, the first image corresponds to the left-eye image and the second image corresponds to the right-eye image, but the flow of the process does not have to be changed even if the left-eye and right-eye images are reversed. The contrast adjusting process is described as an example of the special effects, but the special effects are not limited to the contrast adjustment. For example, the special effects may be luminance adjustment or color correction.

Summary for First and Second Embodiments

In the special effects apparatus according to the first and second embodiments, a range of one image composing a 3D image on which special effects are created is used as a reference, and a range of the other image on which the special effects are created can be automatically determined with disparity on the original 3D image being retained. For this reason, the natural 3D special effects that do not deteriorate a stereoscopic effect of the original 3D image can be provided. Further, only when the range on which the special effects are created is specified on one image, the process can be automatically executed on the other image. For this reason, the workload for editing can be reduced.

The mosaic processing and the contrast adjusting process are mainly described as the examples of the special effects, but the special effects include a digital removal process, and a calibration process for differences between left-eye and right-eye images due to an individual difference between the left-eye camera 101L and the right-eye camera 101R (differences in shade, hue, and luminance).

The special effects apparatus is not limited to the form of the editing apparatus for captured 3D image data. The special effects apparatus may be incorporated in an image pickup apparatus for capturing a 3D image.

Further, the special effects apparatus may be realized by a computer and a computer program including instructions to a computer. The computer program may be recorded onto a non-transitory computer-readable recording medium so as to be distributed. The computer program may be delivered through a communication line such as the Internet.

The special effects are not limited to the above examples and may include special effects that are realized by various types of image processing algorithms.

The special effects apparatuses according to the embodiments are useful for special effects apparatuses suitable for processing 3D images, for example.

What is claimed is:

1. A 3D image special effects apparatus for creating special effects on a 3D image including a first image and a second image having disparity, the apparatus comprising:
   a range specification receiving unit capable of receiving an input of a specified range of the first image on which the special effects are created;
   a first block division unit capable of dividing the specified range into a plurality of first image blocks;
   a first special effects unit capable of creating the special effects on each of the plurality of the first image blocks;
   a block matching unit capable of determining an image from the second image which corresponds to an image of the each of the plurality of the first image blocks, and deriving a parallax vector which represents a directionality and a magnitude of parallax between the first image blocks and the corresponding image;
   a second block division unit capable of determining a plurality of second image blocks on the second image in accordance with the parallax vector, the second image blocks corresponding to the plurality of first image blocks; and
   a second special effects unit capable of creating the special effects on the determined plurality of second image blocks;
   wherein the second special effects unit includes:
   a depth determining unit capable of determining a depth of each of the plurality of the second image blocks in the 3D image based on the directionality and the magnitude of the parallax vector;
   an order determining unit capable of determining an order of the special effects among the plurality of the second image blocks based on the depth; and
   a second special effects processing unit capable of creating the special effects on the each of the plurality of the second image blocks in accordance with the order;
   wherein the order of the special effects processing determined by the determining unit is arranged to prioritize processing of blocks among the plurality of second image blocks which appear farthest from a viewer in the 3D image.

2. The 3D special effects apparatus according to claim 1, wherein the block matching unit performs block matching onto a partial region of the second image only in a horizontal direction.

3. The 3D special effects apparatus according to claim 1, wherein the parallax vector derived by the block matching unit has an accuracy in a one-pixel unit.

4. The 3D special effects apparatus according to claim 1, wherein the special effects are mosaic processing.

5. The 3D special effects apparatus according to claim 1, wherein the special effects are a contrast adjusting process.

6. A method for creating 3D image special effects in which special effects are created on a 3D image including a first image and a second image having disparity, the method comprising:
   receiving an input of a specified range of the first image on which the special effects are created;
   dividing the specified range into a plurality of first image blocks;
   creating the special effects on each of the plurality of first image blocks;
   determining an image from the second image which corresponds to an image of the each of the plurality of the first image blocks, and deriving a parallax vector which represents a directionality and a magnitude of parallax between the first image blocks and the corresponding image;
   determining a plurality of second image blocks on the second image in accordance with the parallax vector, the second image blocks corresponding to the plurality of the first image blocks; and
   creating the special effects on the determined plurality of second image blocks;
   wherein creating the second special effects on the determined plurality of second image blocks includes:
   determining a depth of each of the plurality of the second image blocks in the 3D image based on the directionality and the magnitude of the parallax vector;
   determining an order of the special effects among the plurality of the second image blocks based on the depth; and
   creating the special effects on the each of the plurality of the second image blocks in accordance with the order;
   wherein the determined order of the special effects processing is arranged to prioritize processing of blocks among the plurality of second image blocks which appear farthest from a viewer in the 3D image.

* * * * *